US009158858B2

(12) United States Patent
Oh et al.

(10) Patent No.: US 9,158,858 B2
(45) Date of Patent: Oct. 13, 2015

(54) SYSTEM AND METHOD FOR MANAGING XML DOCUMENT MANAGEMENT SERVER HISTORY

(75) Inventors: Jae-Kwon Oh, Seoul (KR); Mayuresh Madhukar Patil, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1164 days.

(21) Appl. No.: 12/444,301

(22) PCT Filed: Oct. 4, 2007

(86) PCT No.: PCT/KR2007/004852
§ 371 (c)(1),
(2), (4) Date: Dec. 28, 2009

(87) PCT Pub. No.: WO2008/041829
PCT Pub. Date: Apr. 10, 2008

(65) Prior Publication Data
US 2010/0095199 A1     Apr. 15, 2010

(30) Foreign Application Priority Data

Oct. 3, 2006    (IN) ............................ 1817/CHE/2006

(51) Int. Cl.
*G06F 17/22*    (2006.01)
*G06F 17/30*    (2006.01)

(52) U.S. Cl.
CPC ................................ *G06F 17/30908* (2013.01)

(58) Field of Classification Search
CPC ............ G06F 11/1471; G06F 17/2247; G06F 17/30368; G06F 17/30699; G06F 17/30908
USPC ........................... 715/234, 239, 255, 256, 277
See application file for complete search history.

(56) References Cited

U.S. PATENT DOCUMENTS 6,047,313 A  *  4/2000  Hashimoto et al. ........... 709/203
6,119,117 A      9/2000  Yoda et al.
(Continued)

FOREIGN PATENT DOCUMENTS

JP      11-039293      2/1999
JP    2005-167818      6/2005
(Continued)

OTHER PUBLICATIONS

Open Mobile Aliance, "XML Document Management (XDM) Specification", Apr. 15, 2005, publisher: Open Mobile Aliance, pp. 1-46.*
(Continued)

*Primary Examiner* — Wilson Tsui
(74) *Attorney, Agent, or Firm* — The Farrell Law Firm, P.C.

(57) ABSTRACT

A method for managing an Extensible Markup Language (XML) Document Management (XDM) Server history is provided. The method includes receiving, by the XDM Server, XML Documents and Filtering Rules within a filter body in an XCAP request from a first XDM Client Device, wherein the Filtering Rules define operation information performed on specific XML Documents to store as history information and further define when to store the history information of the XML Documents; storing the XML Documents and the Filtering Rules on the XDM Server; and when a second XDM Client Device has access to perform one or more operations on the XML Documents stored in the XDM Server, storing, by the XDM Server, the history information of the XML Documents according to the Filtering Rules by the XDM Server and the one or more operations performed.

26 Claims, 6 Drawing Sheets

(56) References Cited

U.S. PATENT DOCUMENTS

| | | |
|---|---|---|
| 6,795,888 B1 * | 9/2004 | Apacible et al. .................. 711/1 |
| 8,032,411 B2 * | 10/2011 | Huh et al. ..................... 705/14.1 |
| 2002/0087624 A1 * | 7/2002 | Liebenow ..................... 709/203 |
| 2005/0123268 A1 | 6/2005 | Kawaguchi et al. |
| 2005/0223325 A1 | 10/2005 | Naitou |
| 2006/0026220 A1 * | 2/2006 | Margolus ..................... 707/204 |
| 2006/0155726 A1 | 7/2006 | Krasun et al. |
| 2007/0088670 A1 * | 4/2007 | Laurila ............................ 707/1 |
| 2007/0135099 A1 * | 6/2007 | Taylor et al. ............... 455/412.1 |
| 2007/0226295 A1 * | 9/2007 | Haruna et al. ................ 709/204 |
| 2007/0255714 A1 * | 11/2007 | Laurila et al. ..................... 707/9 |
| 2007/0277095 A1 | 11/2007 | Ukigawa |

FOREIGN PATENT DOCUMENTS

| | | |
|---|---|---|
| JP | 2005-284987 | 10/2005 |
| JP | 2006/185366 | 7/2006 |
| WO | WO 2006/051963 | 5/2006 |

OTHER PUBLICATIONS

Fusheng Wang et al., "Preserving and Querying Histories of XML-Published Relational Databases", pp. 26-38, 2003.

Shu-Yao Chien et al, "Efficient Mangement of Multiversion Documents by Object Referencing", Proceedings of the 27th VLDB Conference, 2001.

Qiankun Zhao et al., "XML Structural Delta Mining: Issues and Challenges", Data & Knowledge Engineering, pp. 627-651, Nov. 2006.

Hewlett-Packard: "HP OpenCall XML Document Management Server Software", XP-002661551, Jul. 2006.

* cited by examiner

US 9,158,858 B2

SYSTEM AND METHOD FOR MANAGING XML DOCUMENT MANAGEMENT SERVER HISTORY

FIELD OF THE INVENTION

The present invention in general relates to mobile applications. The present invention is applicable to an XDM Server, where application specific XML documents (Extensible Markup Language Documents) are stored. The invention further relates to the XCAP protocol used for management of XML documents in the server. More particularly, this invention relates to a system and method for XDM Server history storage enhancements.

2. Description of the Related Art

The various SIP (Session Initiation Protocol) based communication applications, such as a PoC (Push to talk Over Cellular) and an IM XDM Server (Instant Messaging XDM Server), are for storage of the various documents for an authorization policy, contact list, group list. This kind of information is stored in the application specific XDM Server. The shared information will be stored in the shared XDM Server. The OMA (Open Mobile Alliance) forum is standardizing the XDM Protocol for efficient XML document management for various mobile applications, e.g. the IM XDM Server, Presence XDM Server, for storing the authorization rules and contact and group contact information. XMDS protocol allows the addition, creation, deletion, and modification operation on XML documents.

The basic architecture for SIP-based communication applications is shown in FIG. 1. Referring to the architecture, there is an XDM Client Device 110 and an application server 120 e.g. IM Server, Presence server etc. The SIP-IP core 130 resides in between the application server 120 and The XDM Client Device 110. An application specific XDM server is used to store the application specific information (static) in XML format. The XCAP protocol is used to manage such XML formatted information. The XDM Client Device 110 has the XDM Server client for accessing the XML documents through an Aggregation Proxy 150 using the XCAP protocol. This is the standard architecture for the SIP-based application as defined in the OMA forum.

FIG. 2 shows various existing XCAP procedures used for performing the XCAP operations on XML document stored in a XDM Server 140. As shown in FIG. 2, if a Client wants to get a XML resources from The XDM Client Device 110, he sends an XCAP GET request to the XDM Server 140 through the Aggregation Proxy 150. The Aggregation Proxy 150 will authenticate the XDM Client Device 110 (S210).

If the user wants to create or update the existing XML document, and then he sends the XCAP PUT operation and includes the XML content in the body of request to the XDM Server 140 (S220).

If the user wants to delete the XML document or part of XML document, he sends the XML Delete request to the XDM Server 140 (S230).

The XCAP also supports the XCAP POST method for search related operations. Whenever the user wants to search, he sends the XCAP POST method to the Aggregation Proxy 150, and then the Aggregation Proxy 150 forwards the same request to Search Proxy 200. Then intern Search Proxy sends the POST request to the XDM Server 140 and retrieve the information from the XDM Server 140. The Search Proxy aggregates the result and sends the search result to the XDM Client Device 110 (S240).

The OMA forum identified the requirement for the storage of history information for the operation performed on a particular XML document or resource by the user. The main use case for the history storage comes from the delegation (XCAP operations, like adding entry, updating and deleting entry in XML document) operation. A user can authorize other users to modify or access a particular XML document. The storage of operations performed by the other user as history information is important. The user should be able to enable history. Current requirement says storage of the history information. Currently, the user cannot select "what to store in history" and "when to store history" information. It will be beneficial for the user to selectively store the history information. The various limitations of the current state of the art are discussed in the next section and corresponding motivation for new enhancement is also discussed.

In the related art, there is a requirement for the history storage for the operations. The history information is stored in the XDM Server. The history information can be retrieved by the user when required. In the case of related art only enabling or disabling of the history information operations are allowed. The present invention proposes to have filter rules for the history storage. This helps the user to define what to store in the history, and when to store history information. This kind of information is very much beneficial from the user perspective. The following are some weakness in the related art.

1. Possibility of lots of operations being performed by the user, so storing of all the information can be a problem for the server, and later the user may need to fetch entire amount of information for getting history information.

2. Storage of all history information may not be required. So, the current state of the art stores unnecessary information into history information.

3. The event-based history storage is not possible in the current state of the art, and event based means if particular events occur, then only they are stored in the history document. This will be helpful in the many of cases where the user wants to track a particular event rather than tracking the entire sets of events. This will give user flexibility in tracking events as after tracking it is easy to retrieve a particular event history.

4. Currently, in XDM history, the user can not set time-based storage, and this will be more important in a case where an administrator of the document is not present to do operations on that document at particular time of the day. So, during that time, he wants to track operations. This will be very much useful to users.

Technical Objects

Accordingly, the present invention has been made to solve the above-mentioned problems occurring in the prior art, and the present invention provides a method for history storage management, which allows users to set history of any document.

The present invention aims to enhance history storage requirements in XMDS. The present invention defines a filter for selecting the information to be stored in the history, and when to store the history information (event-based history storage). This invention further proposes a method of using the filter rules to achieve that.

Technical Solutions

In accordance with an aspect of the present invention, there is provided a system for managing an XDM Server history, which includes a first XDM Client Device operable to send XML documents (Extensible Markup Language Documents) and Filtering Rules of history information of the XML Documents, a XDM Server operable to receive and store the XML Documents and the Filtering Rules, and a second XDM Client Device operable to have access to the XML Documents stored in the XDM Server, wherein the XDM Server stores the history information as per the Filtering Rules when the second XDM Client Device has access to the XML Documents.

Effects of the Invention

The present invention provides a system and method for history enabling for XDM operations.

Specifically, the present invention further provides a system and method for setting the history filter rules.

In addition, the present invention further provides a system and method for time-based history storage.

BRIEF DESCRIPTION OF THE DRAWINGS

The above and other aspects, features and advantages of the present invention will be more apparent from the following detailed description taken in conjunction with the accompanying drawings, in which.

BEST MODE FOR CARRYING OUT THE INVENTION

Figure 1:
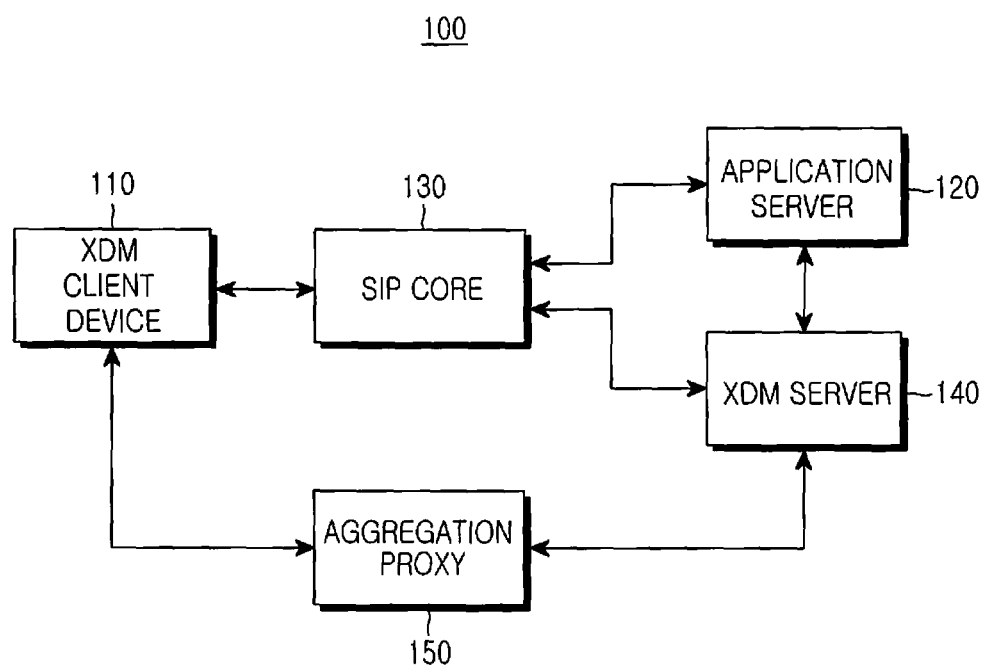
FIG. 1 illustrates a basic architecture for a SIP-based Communication Application.
Figure 2:
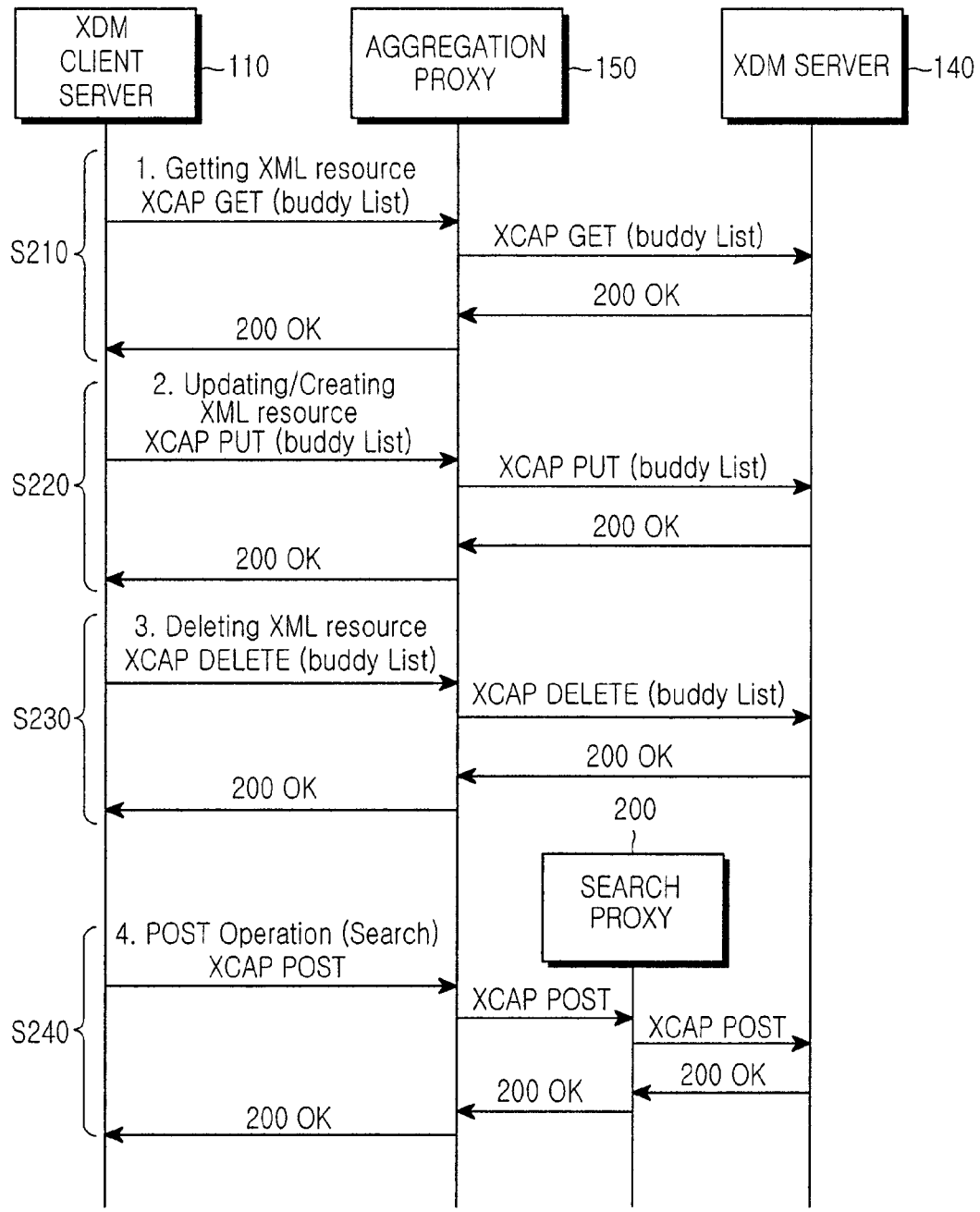
FIG. 2 is a view for illustrating XCAP operations in the current state of the art.

Hereinafter, exemplary embodiments of the present invention will be described with reference to the accompanying drawings. In the following description of the present invention, a detailed description of known functions and configurations incorporated herein will be omitted when it may make the subject matter of the present invention rather unclear.

In order to resolve the limitations of the current XDM history mechanism as described in the above section, the present invention identifies the following new requirements:

1. The user shall be able to enable and disable the history information function.

2. The user shall be able to select which information/operation is to be stored as history information. An example is only the XCAP PUT operation is to be stored as history information, At the user point of view, XCAP PUT is a very important operations rather than XCAP GET. So, instead of storing entire lists of operations, we can store history information for particular operation only.

3. The user shall be able to select upon which event the operation is to be stored as history information. An example is only the delegated operation is to be stored as history information.

4. The user shall be able to select what information in the operation is to be stored as history information. An example is only the XCAP method, the operation requestor, and the time in the operation to be stored as history information.

5. In case of a group document, a group can be created by a user, and this user is called an administrator of that group. An administrator can delegate some operations to the user, but he may want to log critical operation, like adding a particular user, so that administrator can see later point of time who was added into the group.

6. The user can also subscribe to the history document changes of history for getting the instant information for the operation done for particular document. In this user can not get notification of selected operations, such as notify when XCAP put operation is performed by any body, but if the user puts a filter on the history storage, then he can get the selective notifications. This gives more flexibility to users, and also avoids unnecessary history information and notification if the user has subscribed to document changes in the history.

The present invention provides the system and method for history management. The present invention also identifies the above enhancement. The present invention also provides a system and method for this enhancement. The present invention further proposes additional behaviors on the XDM Server and the XDM Client Device. The present invention defines a new filter for history storage. This filter helps in defining time-based history storage. It also defines what to store as history information.

This invention also gives a method for enabling and disabling history storage functionality.

This part of the invention gives detail method for allowing user to set history preferences. The basic proposal is to define the new filtering rules which will be set by user to filter the history storage. This invention defines a new filter body in the XCAP request so that the user can set some preferences in history storage. The new structure will be explained below. Explained here is the basic method for setting the history and corresponding filters associated with it. In this proposal, an XCAP PUT Method is utilized for setting the history function and setting the filters associated with it. The XDM Client Device will use the XCAP PUT request and mention the history setting in the body of the XCAP PUT. So, the XDM Server will receive this request, then store the history preferences, apply the history settings, and store the operations performed by other users in the history document as per filters.

Figure 3:
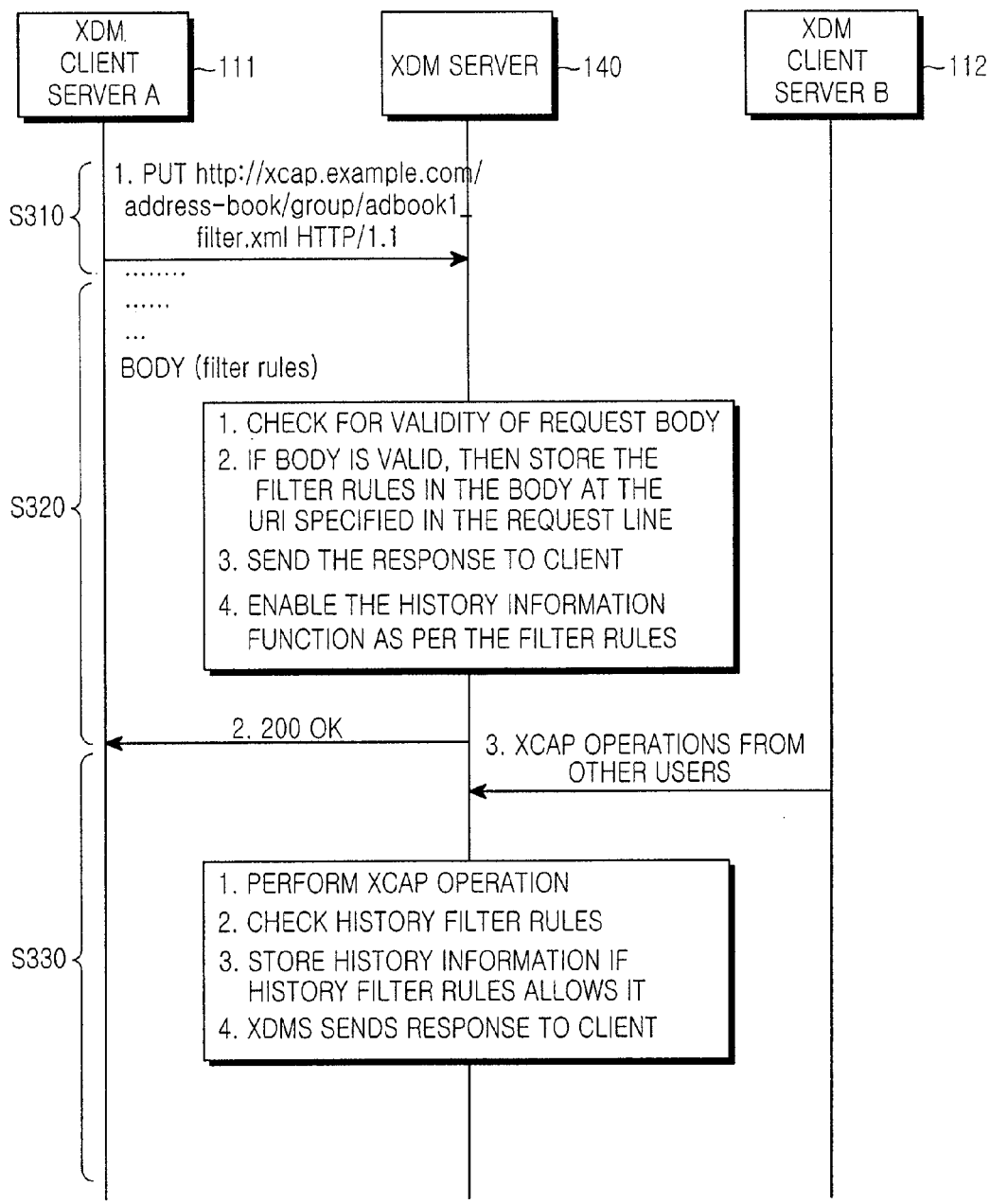
FIG. 3 is a view for illustrating a Logical Flow for History handling using an XCAP PUT Method.

FIG. 3 shows basic logical flows for this function. The XDM Client Device 111 and 112 and XDM Server 140 behavior will be explained below.

Hereinafter, the XDM Client Device 111 and 112 side behaviors are described (S310). As shown in FIG. 3, the client will send a request for storage of history information of operations performed on a particular resource (i.e., an XML document in the XDM Server). The user can also add filter information for what kind of information needs to be stored in the history and when to store the history information. Once the XDM Client Device 111 enables the history information and also set the filter information for this, the XDM Server 140 will store the history information on operation performed on that particular resource identified by the request. The Filter allows users to set which operation and what parts of the operation are to be stored as history information, and also to set the time duration for the history storage. The user can also set history storage for the selected operations. The method which is used for this operation is XCAP PUT. The present invention also defines the new content type for the history control information in the body of XCAP PUT request. Thus The XDM Client Device 111 will send XCAP PUT request with appropriate body. This body identifies resources on which the history function is to be enabled. This filter body also allows to define various filtering rules for supporting various enhancement proposed in this invention. The XDM Client Device 111 appropriately generates the request and sets the history rules into the XDM Server 140. According to such rules, the XDM Server 140 will store the history information.

Meanwhile, XDM Server 140 side behavior is as follows (S320).

The XDM Server 140 receives the history request from the XDM Client Device 111 along with the history filter rules in its body. The XDM Server 140 stores the history filter rules and enables the history function for the target resource identified in the request. Then, the XDM Server 140 starts storing the history information of operations performed on the resource as per the filter setting.

The detailed behavior of the XDM Server follows,

When the XDM Server 140 receives the XCAP PUT request, it will check for the validity of the body. Such a validity check includes checking whether the specified target resource or XML document exists in the XDM Server 140;

Upon the successful validity check, the XDM Server 140 stores, in the URI location specified in the Request Line, the history rules in the body of the XCAP PUT request; and Upon successful processing, the XDM Server 140 sends the response to the XDM Client Device 111, and enables the history function as per the history rules.

The following Table 1 is an example of the history filter body.

```
<?xml version="1.0" encoding="UTF-8"?>
<xs:schema xmlns="urn:oma:params:xml:ns:XDMHistory"
xmlns:xs="http://www.w3.org/2001/XMLSchema"
targetNamespace="urn:oma:params:xml:ns:XDMHistory">
<!-- Defination of Simple Elements -->
<xs:attribute name="State">
<xs:simpleType>
<xs:restriction base="xs:string">
<xs:enumeration value="ON"/>
<xs:enumeration value="OFF"/>
</xs:restriction>
</xs:simpleType>
</xs:attribute>
<xs:attribute name="CondID" type="xs:string"/>
<xs:attribute name="Resource" type="xs:anyURI"/>
<xs:element name="OppType">
<xs:simpleType>
<xs:restriction base="xs:string">
<xs:enumeration value="ADD"/>
<xs:enumeration value="REMOVE"/>
<xs:enumeration value="REPLACE"/>
<xs:enumeration value="NEW"/>
</xs:restriction>
</xs:simpleType>
</xs:element>
<xs:element name="Include">
<xs:simpleType>
<xs:restriction base="xs:string">
<xs:enumeration value="Opptype"/>
<xs:enumeration value="timestamp"/>
<xs:enumeration value="User"/>
<xs:enumeration value="change"/>
<xs:enumeration value="Original Value"/>
<xs:enumeration value="FreeText"/>
</xs:restriction>
</xs:simpleType>
</xs:element>
<xs:element name="User" type="xs:anyURI"/>
<xs:complexType name="timeAttrib">
<xs:simpleContent>
<xs:extension base="xs:boolean">
<xs:attribute name="From" type="xs:time" use="required"/>
<xs:attribute name="TO" type="xs:time" use="required"/>
<xs:anyAttribute namespace="##other" processContents="lax"/>
</xs:extension>
</xs:simpleContent>
```

-continued

```
</xs:complexType>
<!-- Defination of complex Elements -->
<xs:element name="FilterCond">
<xs:complexType>
<xs:sequence>
<xs:element ref="OppType" minOccurs="0" maxOccurs="unbounded"/>
<xs:element ref="User" minOccurs="0" maxOccurs="unbounded"/>
<xs:element name="timeAttrib" type="xs:time" minOccurs="0"/>
</xs:sequence>
<xs:attribute ref="CondID"/>" use="Required"/>
<xs:attribute ref="Resource"/>
<xs:attribute ref="State"/>
</xs:complexType>
</xs:element>
<xs:element name="WhatStore">
<xs:complexType>
<xs:sequence>
<xs:element ref="Include"/>
</xs:sequence>
</xs:complexType>
</xs:element>
<xs:element name="History">
<!-- Defination of Root Element -->
<xs:complexType>
<xs:sequence>
<xs:element ref="FilterCond" minOccurs="0" maxOccurs="unbounded"/>
<xs:element ref="WhatStore" minOccurs="0" maxOccurs="1"/>
</xs:sequence>
<xs:attribute ref="State" use="required"/>
<xs:attribute ref="Resource" use="required"/>
</xs:complexType>
</xs:element>
</xs:schema>
```

Figure 4:
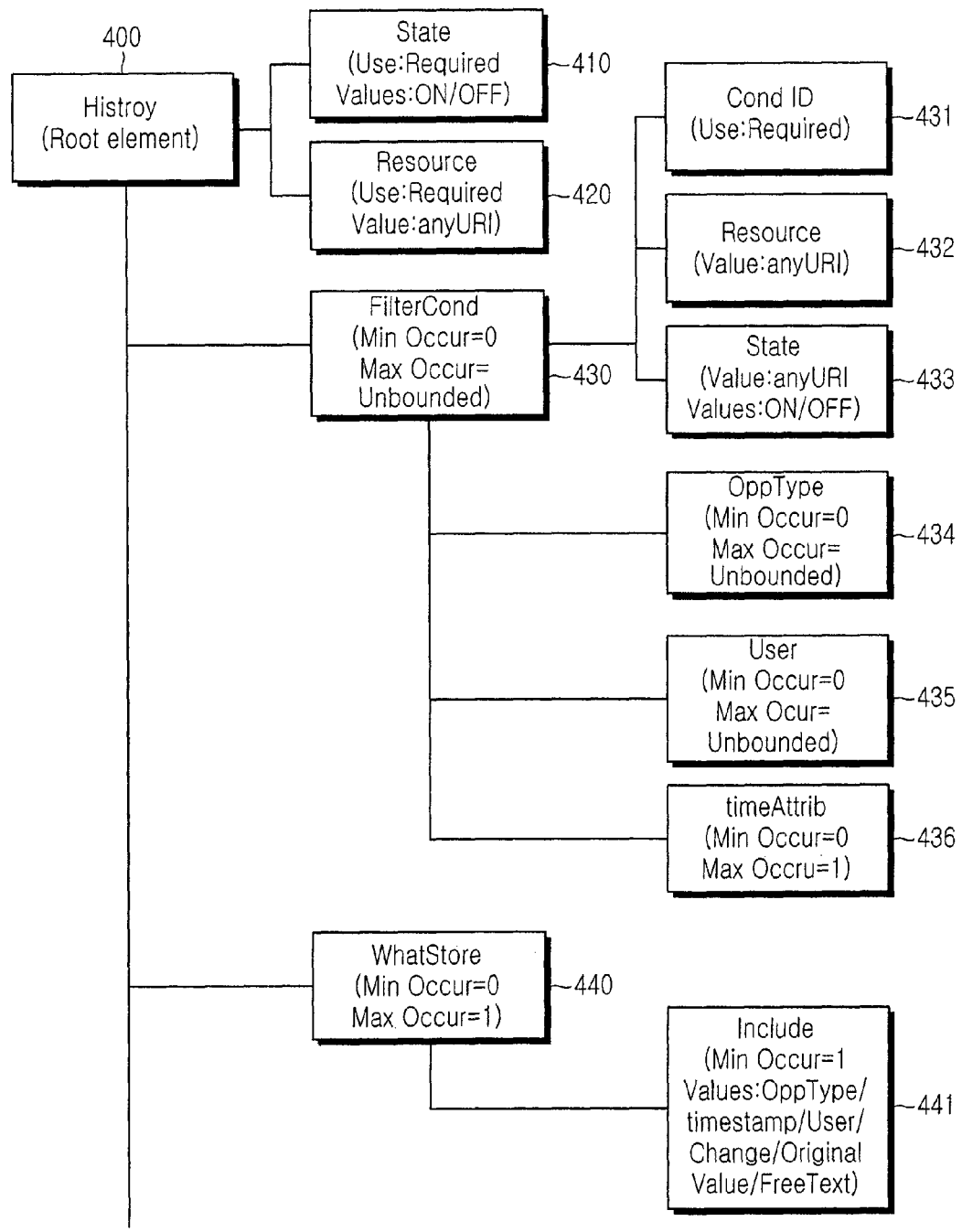
FIG. 4 illustrates a Logical Schema structure.

FIG. 4 shows a schema structure diagram, and Table 1 shows the detail history filter schema. The Schema is used in the XCAP PUT body. This schema enables users to enable/disable the history storage and to set the filter rules related to history storage. The schema defines one root element called "History" 400. The "History" 400 element has two attributes called "State" 410, which tells whether history is enabled or disabled, and "Resource" 420, which contains the URI that identifies the target XML document on which the history function is to be enabled/disabled. For example, if a user wants to have the history of operations performed on his/her Contact list, then "Resource" will be the URI of that Contact list. There are two elements defined inside the root element; one "FilterCond" 430, which defines the filter rules for history, and other is "Whatsrore" 440, which tells what parts of the operation (information) are to be stored as history information.

"FilterCond" 430 element defines conditions for storing the history information. It has three child elements; "OppType" 434, "User" 435, and "TimeAttrib" 436. The "OppType" 434 element is used to define which operation should be recorded as history information. It can take various values, like ADD, REMOVE, REPLACE, and NEW. If the "OppType" 434 is set as ADD, then all addition operations are stored as history information. "User" 435 element is used to specify that when the specified user requests the operation then the operation is to be recorded as history information. The "TimeAttrib" 436 is an element used to specify the time period during which the operations should be stored as history information. "FilterCond" 430 has three attributes; "CondID" 431, which is used for identifying the filter rule, "Resource" 420, which tells on which resource this filter rules is to be applied, and "State" 410, which indicates the active status for particular filter rule.

"WhatStore" 440 is used to define the various values that need to be captured into the history document. It has one element called "Include" 441. The user can use this "include" 441 element to indicate information that should be stored in the history storage.

Hereinafter, the XDM Client Device side processing rules are explained. The XDM Client Device 110 will use the XCAP PUT method for the enabling and disabling of the history storage. Here, the XDM Client Device 110 will include the body for defining various filtering rules using the schema defined in the present invention. The XDM Client Device 110 can define the various types of conditions using the "FilterCond" 430. The XDM Client Device 110 can also include more than one "FilterCond" 430 element. The rules defined under different "FilterCond" 430 elements will be logically OR.

The XDM Client Device 110 can also tell what information should be included into the history document using the "WhatStore" element by including one or more "Include" 441 elements. For e.g. if the user wants to add only a user name in a history document, then the user will add the "Include" 441 element in the "WhatStore" 440, element and set a value to the user.

The following Table 2 is an example of enabling the history.

```
PUT http://xcap.example.com/address??book/users/
adbook1_filter.xml HTTP/1.1
Host: xcap.example.com
User??Agent: XDM??client/OMA1.0
Date: Tue, 01 Aug 2006 17:00:01 GMT+9
X??XCAP??Asserted??Identity:
"sip:history_function_request or@example.com"
Content??Type: application/vnd.oma.history+xml
Content??Length: (...)
<?xml version="1.0" encoding="UTF??8"?>
<!???? Enable History ????>
<History xmlns=="urn:ietf:params:xml:ns:XDMHistory" State="ON"
Resource="http://xcap.example.com/address??book/users/ adbook1">
</History>
```

Table 2 shows the body when The XDM Client Device 110 wants to enable the XDM history on group address list. Here, the XDM Client Device 110 includes the root element, and the 'State' 410 attribute is set to "ON". The XDM Client Device 110 also sets the value of the 'Resource' 432 attribute as the URI of address book. In this way, the XDM Client Device 110 can enable the history for a particular resource.

The following Table 3 is an example of enabling the history and setting the filter rules.

```
PUT http://xcap.example.com/address??book/users/
adbook1_filter.xml HTTP/1.1
Host: xcap.example.com
User??Agent: XDM??client/OMA1.0
Date: Tue, 01 Aug 2006 17:00:01 GMT+9
X??XCAP??Asserted??Identity:
"sip:history_function_request or@example.com"
Content??Type: application/vnd.oma.history+xml
Content??Length: (...)
<?xml version="1.0" encoding="UTF??8"?>
<!???? Enable History ????>
<History xmlns=="urn:ietf:params:xml:ns:XDMHistory"    State="ON"
Resource="http://xcap.example.com/address??book/users/ adbook1">
<FilterCond ConID="132" State="ON">
<OppType>ADD</OppType>
</FilterCond>
</History>
```

In Table 3, the XDM Client Device 110 sets the filter rule which tells the XDM Server 140 to store only the 'ADD' operation as the history information.

Hereinafter, the XDM Server 140 side processing rules are explained. When the XDM Client Device 110 sends the XCAP PUT request, the XDM Server 140 will check the content type, an if the Content type is "application/ynd.oma.history+xml", the XDM Server 140 will know it is a history request. So the XDM Server 140 will check for the existence of filter rules, and if they are already there, then it is request for changing the filter rules. If they do not exist, then the XDM Server 140 will create and store the requested filter rules at the URI as specified in the request line of the XCAP PUT request. Then, the XDM Server 140 will store the result as a response.

The XDM Server 140 will store the filter body and enable/disable the history storage as per the request. The XDM Server 140 will extract the history body, and check the validity of the filter body. The XDM Server 140 will check the 'State' 410 attribute of root element History, if the state 410 element is ON then it means history is turned on. Otherwise it is turned off. So, the 'State' 410 attribute is used to enable or disable the history information. The XDM Client Device 110 can include one or more filter conditions to set the conditions when to store the history information. If the "OppType" 434 is set as "ADD", then only the Adding request will be recorded into the XDM history. Similarly when "User" 435 element is set to particular name, then operations performed by that user will be stored in the history information. Similarly if the "TimeAttrib" 436 is set by user, the XDM Server 140 will use this time period for noting the history information. The XDM Client Device 110 can include the multiple filter conditions; the XDM Server 140 will do the logical OR of these conditions. The XDM Server 140 also extracts the "whatStore" 440 element, which tells what to store in the history document.

Hereinafter, an alternate Solution for history control based on POST request will be explained.

Figure 5:
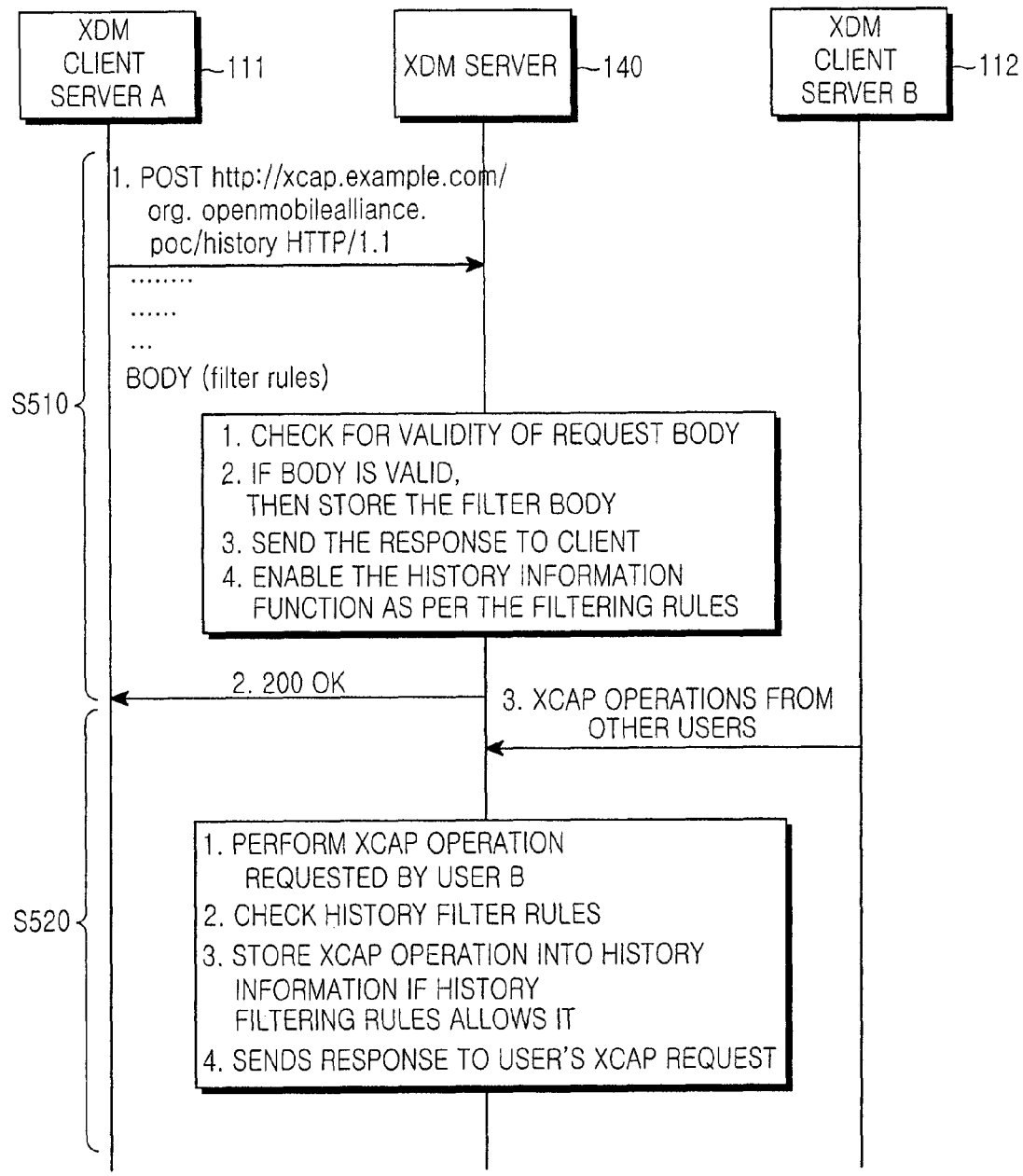
FIG. 5 a view for illustrating Logical Flows for an XCAP POST based Solution.

In the present invention, we are proposing XCAP POST request for setting the history and setting filter rules. Here, the XDM Client Device 110 uses the XCAP POST request with the same body as proposed above. FIG. 5 shows the basic flow for setting the history storage.

The following Table 4 is an example of a request message from the XDM Client Device 110 that enables the history function on a target resource (The following example enables the history function for the PoC group document in the PoC XDM Server).

```
POST http://xcap.example.com/org.openmobilealliance.poc/history
HTTP/1.1
Host: xcap.example.com
User-Agent: XDM-client/OMA1.0
Date: Tue, 01 Aug 2006 17:00:01 GMT+9
X-XCAP-Asserted-Identity:
"sip:history_function_request or@example.com"
Content-Type: application/vnd.oma.history+xml
Content-Length: (...)
<History xmlns="urn:ietf:params:xml:ns:XDMHistory"
Resource="http://xcap.example.com/org.openmobilealliance.poc/users/
sip:history_function_request or@example.com/poc-groups.xml"
State="ON" />
```

The request line contains the routable URI to the XDM Server 140 (which is "http://xcap.example.com/org.openmobilealliance.poc"), and the service directory for history function control (which is "/history").

The body contains the target resource and the history function control (i.e., ON/OFF). The body may contain further history function controls, such as the filter as proposed by this IDF.

Upon enabling the history function, the predefined history document for the target resource, e.g., "_poc-groups.history.xml_" will be used to store history information. This is a system-generated user document for history storage.

Hereinafter, an alternate Method using SIP SUBSRIBE will be explained.

In this method, we propose to have the SIP SUBSCRIBE method for setting the history and getting the notification for operations performed by other users. Here in this mechanism user will send the SUBSCRIBE body with an event package as XDM-History. This method proposes a new event package called XDM-History, which can be utilized for enabling or disabling the history function.

In this method, if the user wants to enable a history function, then the user sends the SIP SUBSCRIBE method with the event package as XDM-History to the XDM Server 140. When the XDM Server 140 receives the SIP SUBSCRIBE with the event as XDM-History function, then the server identify it as the user requesting the history function.

Note that, in the same request, the user can request Notification for an operation performed. This can be done by sending the SUBSCRIBE request with expires field as nonzero value. Thus, the XDM Server 140 can send the notification as well when some operation is performed by the user and the XDM Server 140 also stores the corresponding operation in history function.

Figure 6:
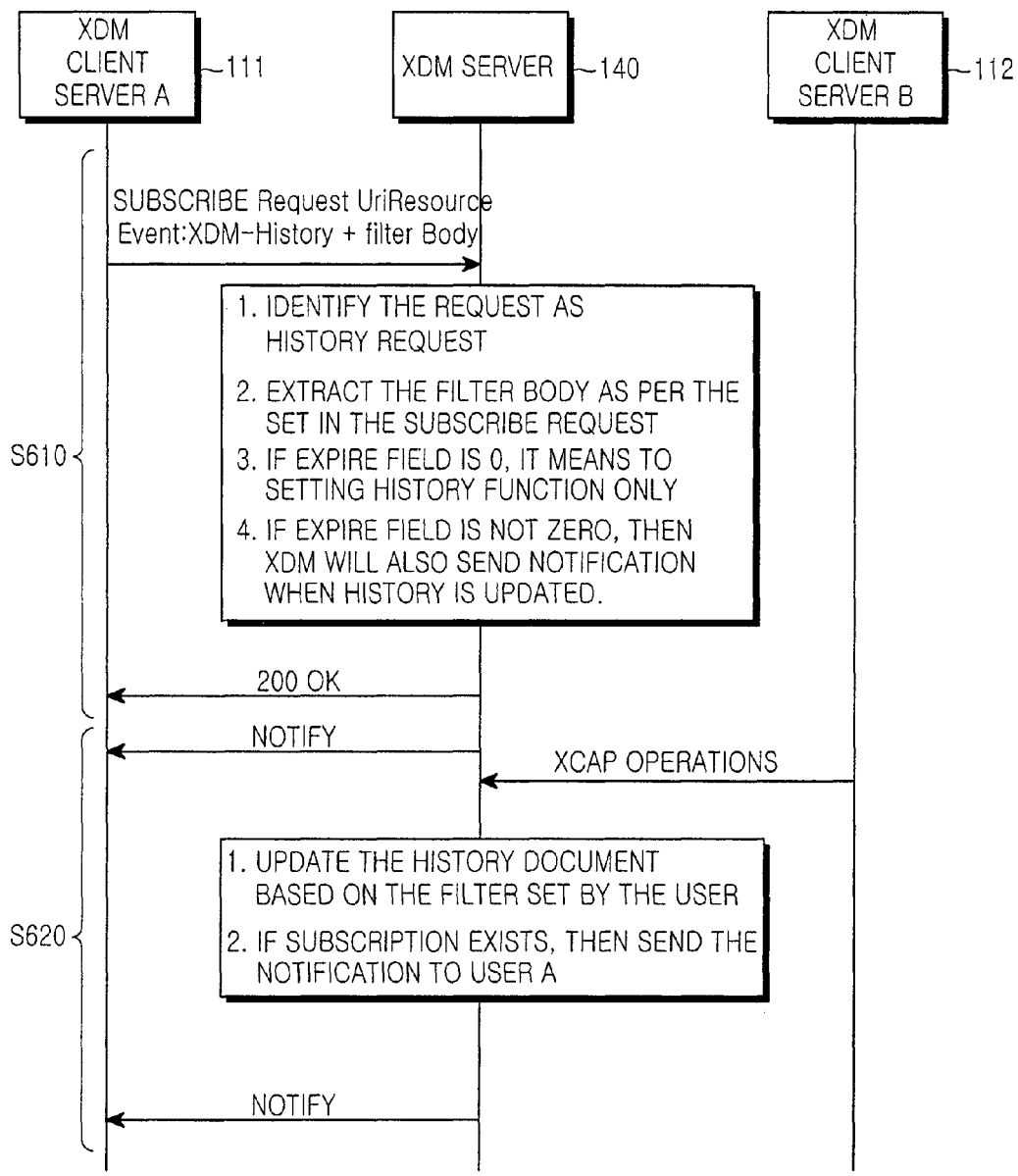
FIG. 6 illustrates a Logical Flow for History handling using a SIP SUBSCRIBE Method.

If the user wants to set filtering rules for storing of history function, based on the history filter schema defined above, then user include this filtering body in the SIP SUBSCRIBE BODY. The same body format can be used as defined above. FIG. 6 shows basic logical flows for this method.

If the user wants to enable the history function then, he generates the SIP SUBSCRIBE request and includes the filter body for history preferences, and then sets the Request-URI to "Resource" 432. If user wants to receive the notification for key operations, then the user put Expires field value as non zero. If the user wants to only enable or disable History functionality then the user will make Expires field zero.

The following Table 5 shows an example of a SUBSCRIBE for setting the history.

---

SUBSCRIBE sip:my-buddy-list@example.com SIP/2.0
Via: SIP/2.0/TCP terminal.example.com;
branch=z9hG4bKwYb6QREiCL
Max-Forwards: 70
To: <sip:my-buddy-list@example.com>
From: <sip:brian@example.com>;tag=ie4hbb8t
Call-ID: cdB34qLToC@terminal.example.com
CSeq: 322723822 SUBSCRIBE
Contact: <sip:terminal.example.com>
Event: XDM-History
Expires: 0
Accept: application/vnd.oma.history+xml
Content-Type: application/vnd.oma.history+xml
Content-Length: ...
<History xmlns=="urn:ietf:params:xml:ns:XDMHistory" State="ON"
Resource="http://xcap.example.com/address-book/users/ adbook1">
<FilterCond ConID="132" State="ON">
    <OppType>ADD</OppType>
</FilterCond>
</History>

---

Table 5 shows the SIP SUBSCRIBE request format for setting the history function. The user who wants to enable the history function will send the SUBSCRIBE request with the event as XDM-History, and include the application/vnd.oma.history+xml for setting the history preferences. In this way, the user can use a SIP SUBSCRIBE request for setting the history and also setting notification for history for getting the instant notification for the operations preformed in particular resources.

Hereinafter, an alternate Method using SIP SUBSCIBE using XCAP-Diff will be explained.

This part of the invention explains approach by which user can subscribe to history document for instant notification of particular operations. This method utilizes the XCAP-Diff event package for subscribing the history document changes. This invention also proposes to include the some history filters for setting the history filtering rules along with the SUBSCRIBE request.

The following Table 6 shows examples for a SUBSCRIBE request which uses XCAP-diff event package for subscribing the history document changes and setting the history filtering rules.

---

SUBSCRIBE http://xcap.example.com/org.openmobilealliance.poc/
historySIP/2.0
Via: SIP/2.0/UDP
Max-Forwards: 70
Route: <sip:pcscf1.visited1.net:7531;lr;comp=sigcomp>,
<sip:orig@scscf1.home1.net;lr>
From: <sip:joe.bloggs@example.com>;tag=31415
To: <sip:joe.bloggs@example.com>
Event: xcap-diff;path="org.openmobilealliance.groups/users/sip:
joe.bloggs@example.com/joebloggs_friends"
Call-ID: b89rjhnedlrfjflslj40a222
CSeq: 85 SUBSCRIBE
P-Preferred-Identity: "Joe Bloggs" <sip:joe.bloggs@example.com>
Privacy: none
Expires: 600000
Accept: application/xcap-diff+xml, application/vnd.oma.history+xml
Contact: <sip:Joe.bloggs@example.com>
Content-type: application/vnd.oma.history+xml
Content-Length: ...
<History xmlns=="urn:ietf:params:xml:ns:XDMHistory" State="ON"
Resource="http://xcap.example.com/address-book/users/ adbook1">
<FilterCond ConID="132" State="ON">
<OppType>ADD</OppType>
</FilterCond>
</History>

---

As shown in Table 6 above, this uses the XCAP-diff operation for setting the history for the particular resources. It sends the SUSBCRIBE request with event package as an XCAP-diff and also includes the body with history settings with content-type as "application/vnd.oma.history+xml".

When the XDM Client Device 110 wants to set history for his contact list then he sends the SUBSCRIBE request with the package name as an XCAP-diff, and then includes the history related settings. As shown in Table 6, in this setting the user will specify the resource on which history need to be activated.

Another alternative mechanism for 1) Mechanism for enabling/disabling of history information, could be to utilize SIP MESSAGE, for example, the history information could be enabled and controlled with a SIP MESSAGE request with time duration and filters.

According to the present invention, the history storage and management can be improved. The user can set event history storage, which allows the history management to be easily performed. Especially, the user can select which information to be stored in the history and when to store, which prevents unnecessary history information from being stored, and thus allows history management to be easily performed. In addition, the user can easily perform searching and retrieving of the history information.

Meanwhile, the user can set the time-based history storage, which also allows the history management to be easily performed.

While the invention has been shown and described with reference to certain exemplary embodiments thereof, it will be understood by those skilled in the art that various changes in form and details may be made therein without departing from the spirit and scope of the invention as defined by the appended claims. Accordingly, the scope of the present invention is not limited to the embodiments described above but is defined by the appended claim and equivalents thereof.

What is claimed is:

1. A method for managing an Extensible Markup Language (XML) Document Management (XDM) Server history, the method comprising the steps of:
   receiving, by the XDM Server, XML Documents and Filtering Rules within a filter body in an XCAP request from a first XDM Client Device, wherein the Filtering Rules define operation information performed on specific XML Documents to store as history information and further define when to store the history information of the XML Documents;
   storing the XML Documents and the Filtering Rules on the XDM Server; and
   when a second XDM Client Device has access to perform one or more operations on the XML Documents stored in the XDM Server,
   storing, by the XDM Server, the history information of the XML Documents according to the Filtering Rules by the XDM Server and the one or more operations performed.

2. The method for managing an XDM Server history as claimed in claim 1, wherein the Filtering Rules can be set to be Enablement or Disablement.

3. The method for managing an XDM Server history as claimed in claim 1, wherein performing one or more operations on the XML Documents stored in the XDM Server comprises at least one operation of creating, updating, changing, deleting, searching, or retrieving by the second XDM Client Device.

4. The method for managing an XDM Server history as claimed in claim 1, wherein the Filtering Rules include history preferences based on events and time according to an XML Configuration Access Protocol (XCAP).

5. The method for managing an XDM Server history as claimed in claim 1, wherein the Filtering Rules include time period according to storage duration of the history information to be stored in the XDM server.

6. The method for managing an XDM Server history as claimed in claim 1, wherein the step of storing the history information according to the Filtering Rules is performed by storing the history information as a XML Resource in the form of XML.

7. The method for managing an XDM Server history as claimed in claim 1, wherein the step of receiving, by the XDM Server, the XML Documents along with Filtering Rules of history information of the XML Documents from a first XDM Client Device comprises:
   receiving the XML Documents along with Filtering Rules of history information of the XML Documents and values that must be captured into a history document,
   wherein the values that must be captured into the history document are used to tell what information should be included in the history document.

8. A first Extensible Markup Language (XML) Document Management (XDM) Client Device for managing an XDM Server history in an XDM Server, the XDM Server being a XML Document Management Server, the first XDM Client Device comprising:
   a processor configured to set Filtering Rules within a filter body in an XCAP request, wherein the set Filtering Rules define operation information performed on specific XML Documents to store as history information and further define when to store the history information of the XML Documents;
   a transmitter configured to send the XML Documents along with the set Filtering Rules to the XDM Server so that when a second XDM Client Device accesses and performs one or more operations on the XML Documents stored at the XDM Server, history information of the XML Documents can be stored in the XDM Server according to the set Filtering Rules and the one or more operations performed; and
   a receiver configured to receive a response from the XDM Server after the Filtering Rules are stored in the XDM Server.

9. The first XDM Client Device for managing an XDM Server history as claimed in claim 8, wherein the set Filtering Rules can be set to be Enablement or Disablement.

10. The first XDM Client Device for managing an XDM Server history as claimed in claim 8, wherein the second XDM Client Device accesses and performs one or more operations on the XML Documents stored in the XDM Server comprising at least one operation of creating, updating, changing, deleting, searching, or retrieving the XML Documents stored in the XDM Server.

11. The first XDM Client Device for managing an XDM Server history as claimed in claim 8, wherein the set Filtering Rules are history preferences based on event and time according to an XML Configuration Access Protocol (XCAP).

12. The first XDM Client Device for managing an XDM Server history as claimed in claim 8, wherein the set Filtering Rules include a time period according to storage duration of the history information to be stored in the XDM server.

13. The first XDM Client Device for managing an XDM Server history as claimed in claim 8, wherein the XDM Server stores the history information as an XML resource in the form of XML.

14. The first XDM Client Device for managing an XDM Server history as claimed in claim 8, wherein the transmitter sends the XML Documents along with Filtering Rules comprising:
   sending values that must be captured into a history document, and
   wherein the values that must be captured into the history document are used to tell what information should be included in the history document.

15. A method for managing an Extensible Markup Language (XML) Document Management (XDM) Server history in the XDM Server by a first XDM Client Device, the XDM Server being an XML Document Management Server, the first method comprising:
   sending XML Documents along with Filtering Rules within a filter body in an XCAP request to the XDM Server so that when a second XDM Client device accesses and performs one or more operations on the XML Documents stored at the XDM Server, history information of the XML Documents can be stored in the XDM Server according to the Filtering Rules and the one or more operations performed, and
   wherein the Filtering Rules define operation information performed on specific XML Documents to store as history information and further define when to store the history information of the XML Documents; and
   receiving a response from the XDM Server after the Filtering Rules are stored in the XDM Server.

16. The method for managing an XDM Server history as claimed in claim 15, wherein the Filtering Rules can be set to be Enablement or Disablement.

17. The method for managing an XDM Server history as claimed in claim 15, wherein the Filtering Rules are history preferences based on event and time according to an XML Configuration Access Protocol (XCAP).

18. The method for managing an XDM Server history as claimed in claim 15, wherein the Filtering Rules include a time period according to storage duration of the history information to be stored in the XDM server.

19. The method for managing an XDM Server history as claimed in claim 15, wherein the step of sending XML Documents along with Filtering Rules comprises:
  sending the XML Documents along with Filtering Rules, values that must be captured into a history document,
  wherein the values that must be captured into the history document are used to tell what information should be included in the history document.

20. An Extensible Markup Language (XML) Document Management (XDM) Server for managing an XDM Server history, the XDM Server being an XML Document Management Server, the XDM Server comprising:
  a receiver configured to receive Filtering Rules within a filter body in an XCAP request and values that must be captured into a history document from a first XDM Client Device;
  a non-transitory memory configured to store the received Filtering Rules in the XDM Server; and
  a processor configured to determine whether a second XDM Client Device accesses and performs one or more operations on the XML documents stored at the XDM Server and store history information of the XML Documents in the memory according to the stored Filtering Rules and the operations performed, and
  wherein the stored Filtering Rules define operation information performed on specific XML Documents to store as history information and further define when to store the history information of the XML Documents.

21. The XDM Server for managing an XDM Server history as claimed in claim 20, wherein the stored Filtering Rules can be set to be Enablement or Disablement.

22. The XDM Server for managing an XDM Server history as claimed in claim 20, wherein the second XDM Client Device accesses and performs one or more operations on the XML Documents stored in the XDM Server, where the one or more operations comprise creating, updating, changing, deleting, searching, or retrieving the XML Documents stored in the XDM Server.

23. The XDM Server for managing an XDM Server history as claimed in claim 20, wherein the stored Filtering Rules are history preferences based on event and time according to an XML Configuration Access Protocol (XCAP).

24. The XDM Server for managing an XDM Server history as claimed in claim 23, wherein the stored Filtering Rules include a time period according to storage duration of the history information to be stored in the XDM server.

25. The XDM Server for managing an XDM Server history as claimed in claim 20, wherein the XDM Server stores the history information as an XML resource in the form of XML.

26. The XDM Server for managing an XDM Server history as claimed in claim 20, wherein the receiver is configured to receive the XML Documents along with Filtering Rules of history information of the XML Documents and, values that must be captured into a history document which comprise:
  values that are used to tell what information should be included in the history document.

* * * * *